United States Patent
Yoshimatsu et al.

(10) Patent No.: US 12,394,270 B2
(45) Date of Patent: Aug. 19, 2025

(54) NON-TRANSITORY RECORDING MEDIUM AND PAPER SHEET HANDLING APPARATUS

(71) Applicants: FUJITSU FRONTECH LIMITED, Tokyo (JP); FUJITSU FRONTECH SYSTEMS LIMITED, Maebashi (JP)

(72) Inventors: Yoshitaku Yoshimatsu, Inagi (JP); Hirohiko Saito, Inagi (JP); Kazuya Asoo, Inagi (JP)

(73) Assignees: FUJITSU FRONTECH LIMITED, Tokyo (JP); FUJITSU FRONTECH SYSTEMS LIMITED, Maebashi (JP)

( * ) Notice: Subject to any disclaimer, the term of this patent is extended or adjusted under 35 U.S.C. 154(b) by 573 days.

(21) Appl. No.: 17/819,026

(22) Filed: Aug. 11, 2022

(65) Prior Publication Data
US 2022/0383685 A1   Dec. 1, 2022

Related U.S. Application Data

(63) Continuation of application No. PCT/JP2020/006504, filed on Feb. 19, 2020.

(51) Int. Cl.
  G07D 7/189 (2016.01)
  G07D 7/164 (2016.01)
  (Continued)

(52) U.S. Cl.
  CPC .............. G07D 7/189 (2017.05); G07D 7/164 (2013.01); G07D 7/20 (2013.01); G07D 7/2033 (2013.01);
  (Continued)

(58) Field of Classification Search
  CPC .......... G07D 7/189; G07D 7/164; G07D 7/20; G07D 7/2033; G07D 7/206; G07D 7/2083;
  (Continued)

(56) References Cited

U.S. PATENT DOCUMENTS

| | | | |
|---|---|---|---|
| 6,796,434 B2* | 9/2004 | Kako | B65H 7/02 271/262 |
| 2012/0256371 A1 | 10/2012 | Woodford | |
| 2014/0175740 A1* | 6/2014 | Chang | G07D 7/20 |

FOREIGN PATENT DOCUMENTS

| | | | |
|---|---|---|---|
| JP | 04140250 A | 5/1992 | |
| JP | 09301576 A | 11/1997 | |

(Continued)

OTHER PUBLICATIONS

Search report issued in corresponding European patent application No. EP20 920 338.9, dated Oct. 20, 2023.

(Continued)

*Primary Examiner* — Jeffrey A Shapiro
(74) *Attorney, Agent, or Firm* — Greer Burns & Crain Ltd.

(57) ABSTRACT

A paper sheet handling apparatus includes: a displacement amount detector that includes a pressing part intended to press a paper sheet against a transporting face of a paper sheet transporting path and having an initial position at which the pressing part is not in contact with the transporting face of the paper sheet transporting path, the displacement amount detector detecting a displacement amount of displacement of the pressing part from the initial position in a direction perpendicular to the transporting face, the pressing part being displaced according to a thickness of a paper sheet passing between the transporting face and the pressing part; a reference displacement amount storage; a paper sheet thickness storage; and a tape thickness threshold storage.

10 Claims, 8 Drawing Sheets

(51) Int. Cl.
*G07D 7/20* (2016.01)
*G07D 7/2033* (2016.01)
*G07D 7/206* (2016.01)
*G07D 11/16* (2019.01)
*G07D 11/14* (2019.01)

(52) U.S. Cl.
CPC .......... *G07D 7/206* (2017.05); *G07D 7/2083* (2013.01); *G07D 7/2091* (2013.01); *G07D 11/16* (2019.01); *B65H 2301/141* (2013.01); *B65H 2301/142* (2013.01); *B65H 2301/211* (2013.01); *B65H 2301/212* (2013.01); *B65H 2511/13* (2013.01); *B65H 2557/64* (2013.01); *G07D 11/14* (2019.01); *G07D 2205/0012* (2013.01); *G07D 2207/00* (2013.01); *G07D 2211/00* (2013.01)

(58) Field of Classification Search
CPC ...... G07D 7/2091; G07D 11/16; G07D 11/14; G07D 2205/0012; G07D 2207/00; G07D 2211/00; G07D 7/183; B65H 2301/141; B65H 2301/142; B65H 2301/211; B65H 2301/212; B65H 2511/13; B65H 2557/64; G01B 5/068
See application file for complete search history.

(56) References Cited

FOREIGN PATENT DOCUMENTS

| | | |
|---|---|---|
| JP | 11091991 A | 4/1999 |
| JP | 2002032816 A | 1/2002 |
| JP | 2005258610 A | 9/2005 |
| JP | 2012041194 A | 3/2012 |

OTHER PUBLICATIONS

ISR issued in PCT/JP2020/006504, mailed Apr. 14, 2020.
Written opinion of the ISA issued in PCT/JP2020/006504, mailed Apr. 14, 2020.

* cited by examiner

NON-TRANSITORY RECORDING MEDIUM AND PAPER SHEET HANDLING APPARATUS

CROSS-REFERENCE TO RELATED APPLICATION

This application is continuation application of International Application PCT/JP2020/006504 filed on Feb. 19 2020 and designated the U.S., the entire contents of which are incorporated herein by reference.

TECHNICAL FIELD

The present invention relates to a non-transitory recording medium and an apparatus for handling paper sheets such as bills.

BACKGROUND ART

A bill handling apparatus has conventionally known as an example of a paper sheet handling apparatus.

A bill handling apparatus has functions for determining the number of, and the denomination of, bills inserted into a money insertion port of the apparatus and for inspecting, for example, the registration numbers and the authenticity of the bills, and also has, for example, a function for determining, as a taped note, a bill having tape applied thereto such that this bill is not provided to a customer in a withdrawal process. For example, a customer may apply tape to a torn bill for the purpose of recovering the bill.

With respect to such a bill handling apparatus, a taped note is typically determined using a thickness detection means. Thus, the accuracy of the determination is largely dependent on the performance of the thickness detection means. It is known that thickness detection means are used for a paper sheet handling apparatus such as a bill handling apparatus for the purpose of preventing multi-feeding or forgery of paper sheets (see, for example, Japanese Laid-open Patent Publication No. 2012-041194, Japanese Laid-open Patent Publication No. 2002-032816, and Japanese Laid-open Patent Publication No. 09-301576).

SUMMARY OF THE INVENTION

A non-transitory recording medium in an aspect is a non-transitory recording medium having a paper sheet handling program recorded thereon, the paper sheet handling program that causes a processor for a paper sheet handling apparatus to perform a process, the paper sheet handling apparatus including: a displacement amount detector that includes a pressing part intended to press a paper sheet against a transporting face of a paper sheet transporting path and having an initial position at which the pressing part is not in contact with the transporting face of the paper sheet transporting path, the displacement amount detector detecting a displacement amount of displacement of the pressing part from the initial position in a direction perpendicular to the transporting face, the pressing part being displaced according to a thickness of a paper sheet passing between the transporting face and the pressing part; a reference displacement amount storage that stores a reference displacement amount; a paper sheet thickness storage that stores a thickness of one paper sheet; and a tape thickness threshold storage that stores a tape thickness threshold, the process including: on the basis of the displacement amount detected by the displacement amount detector, the reference displacement amount stored by the reference displacement amount storage, the thickness of one paper sheet stored by the paper sheet thickness storage, and the tape thickness threshold stored by the tape thickness threshold storage, determining which of one paper sheet, a paper sheet having tape applied thereto, two paper sheets laid on top of one another, or another paper sheet is passing between the transporting face and the pressing part; when a determination that one paper sheet is passing between the transporting face and the pressing part is made, updating a value of the reference displacement amount stored by the reference displacement amount storage to a displacement amount detected by the displacement amount detector at a time of the determination; and when a determination that two paper sheets laid on top of one another are passing between the transporting face and the pressing part is made, calculating a thickness of one paper sheet by subtracting the reference displacement amount stored by the reference displacement amount storage from a displacement amount detected by the displacement amount detector at a time of the determination, updating the thickness of one paper sheet stored by the paper sheet thickness storage to the calculated thickness of one paper sheet, calculating a tape thickness threshold on the basis of the calculated thickness of one paper sheet, and updating the tape thickness threshold stored by the tape thickness threshold storage to the calculated tape thickness threshold.

An apparatus in an aspect is a paper sheet handling apparatus including: a displacement amount detector that includes a pressing part intended to press a paper sheet against a transporting face of a paper sheet transporting path and having an initial position at which the pressing part is not in contact with the transporting face of the paper sheet transporting path, the displacement amount detector detecting a displacement amount of displacement of the pressing part from the initial position in a direction perpendicular to the transporting face, the pressing part being displaced according to a thickness of a paper sheet passing between the transporting face and the pressing part; a reference displacement amount storage that stores a reference displacement amount; a paper sheet thickness storage that stores a thickness of one paper sheet; a tape thickness threshold storage that stores a tape thickness threshold; a determinator that, on the basis of the displacement amount detected by the displacement amount detector, the reference displacement amount stored by the reference displacement amount storage, the thickness of one paper sheet stored by the paper sheet thickness storage, and the tape thickness threshold stored by the tape thickness threshold storage, determines which of one paper sheet, a paper sheet having tape applied thereto, two paper sheets laid on top of one another, or another paper sheet is passing between the transporting face and the pressing part; a reference displacement amount updater that, when the determinator makes a determination that one paper sheet is passing between the transporting face and the pressing part, updates a value of the reference displacement amount stored by the reference displacement amount storage to a displacement amount detected by the displacement amount detector at a time of the determination; a paper sheet thickness calculator that, when the determinator makes a determination that two paper sheets laid on top of one another are passing between the transporting face and the pressing part, calculates a thickness of one paper sheet by subtracting the reference displacement amount stored by the reference displacement amount storage from a displacement amount detected by the displacement amount detector at a time of the determination; a paper sheet thickness updater that updates the thickness of one paper sheet stored by the paper sheet thickness storage to the thickness of one paper sheet calculated by the paper sheet thickness calculator; a tape thickness threshold calculator that calculates a tape thickness threshold on the basis of the thickness of one paper sheet calculated by the paper sheet thickness calculator; and a tape thickness threshold updater that updates the tape thickness threshold stored by the tape thickness threshold storage to the tape thickness threshold calculated by the tape thickness threshold calculator.

The object and advantages of the present invention will be realized by the elements set forth in the claims or combinations thereof.

DESCRIPTION OF EMBODIMENTS

Figure 1:
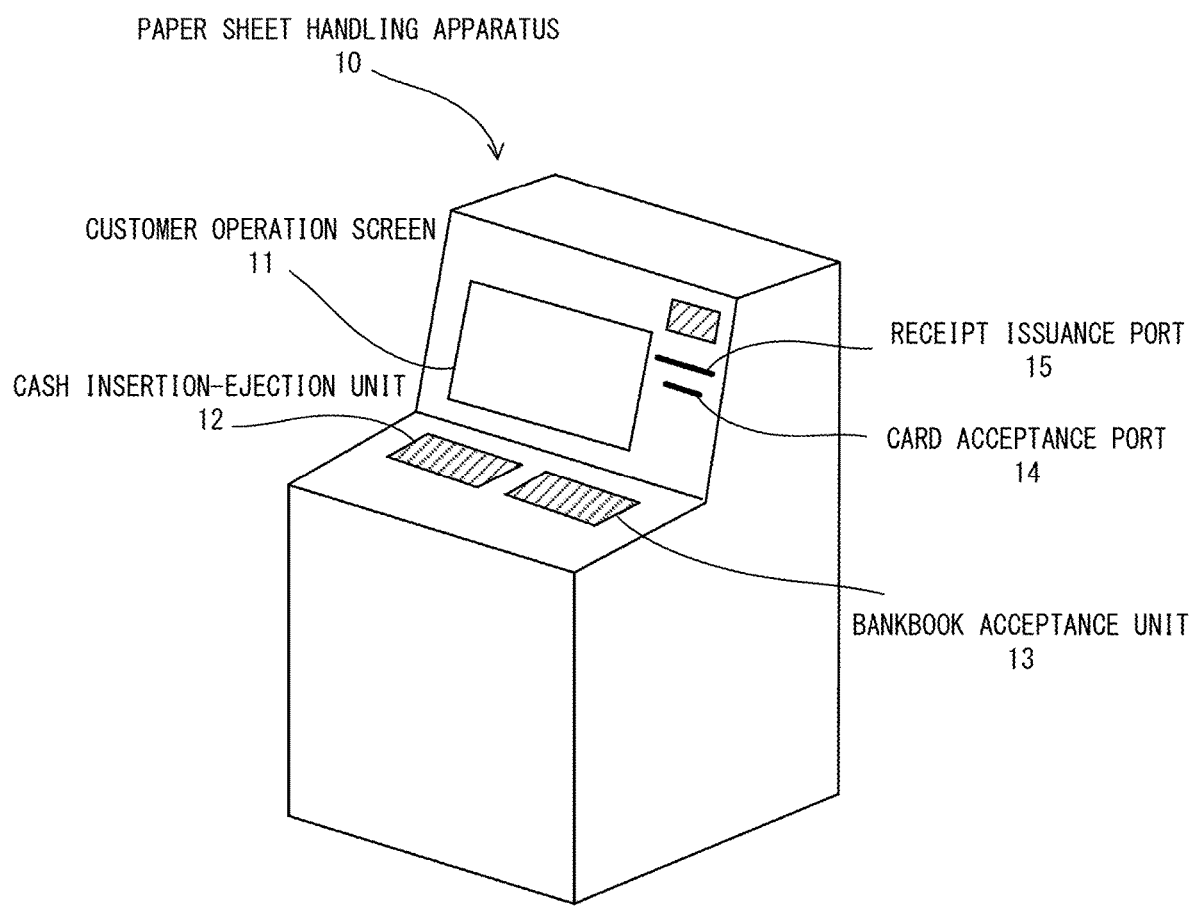
FIG. 1 exemplifies the appearance configuration of a paper sheet handling apparatus in accordance with an embodiment.

The following displacement amount detection means may be used as a thickness detection means for determination of a taped note. The displacement amount detection means includes a pressing part that is intended to press a paper sheet against the transporting face of a paper sheet transporting path and has an initial position at which the pressing part is not in contact with the transporting face of the paper sheet transporting path. The displacement amount detection means detects the amount of displacement of the pressing part, which is displaced according to the thickness of a paper sheet passing between the transporting face and the pressing part, from the initial position in a direction perpendicular to the transporting face.

When the displacement amount detection means is used, the pressing part is not in contact with the transporting face when being located at the initial position, so the thickness of, for example, one paper sheet or a taped note cannot be detected as an absolute amount. An accurate displacement amount may be incapable of being detected due to a temporal variation in the displacement amount detection means, e.g., a temporal variation in the initial position of the pressing part or a temporal variation in an output value of a sensor of the displacement amount detection means. As a result, the determination for a taped note may not be incapable of being accurately performed.

The following describes embodiments of the present invention by referring to the drawings.

FIG. 1 exemplifies the appearance configuration of a paper sheet handling apparatus in accordance with an embodiment.

For example, a paper sheet handling apparatus 10 exemplified in FIG. 1 may be an automated teller machine (ATM) installed in a financial institution such as a bank or in a convenience store, or may be a bill handling apparatus.

The paper sheet handling apparatus 10 includes a customer operation screen 11, a cash insertion-ejection unit 12, a bankbook acceptance unit 13, a card acceptance port 14, and a receipt issuance port 15.

The customer operation screen 11, which is, for example, a touch panel display, displays various screens such as a transaction screen and accepts an operation input from a customer.

The cash insertion-ejection unit 12 accepts coins and bills to be deposited and ejects coins and bills to be withdrawn. Note that a bill is an example of a paper sheet.

The bankbook acceptance unit 13 accepts and returns a bankbook.

The card acceptance port 14 accepts a card to be used for a transaction (e.g., a cash card) and returns the card.

The receipt issuance port 15 ejects an issued receipt (a receipt on which transaction details are printed).

Figure 2:
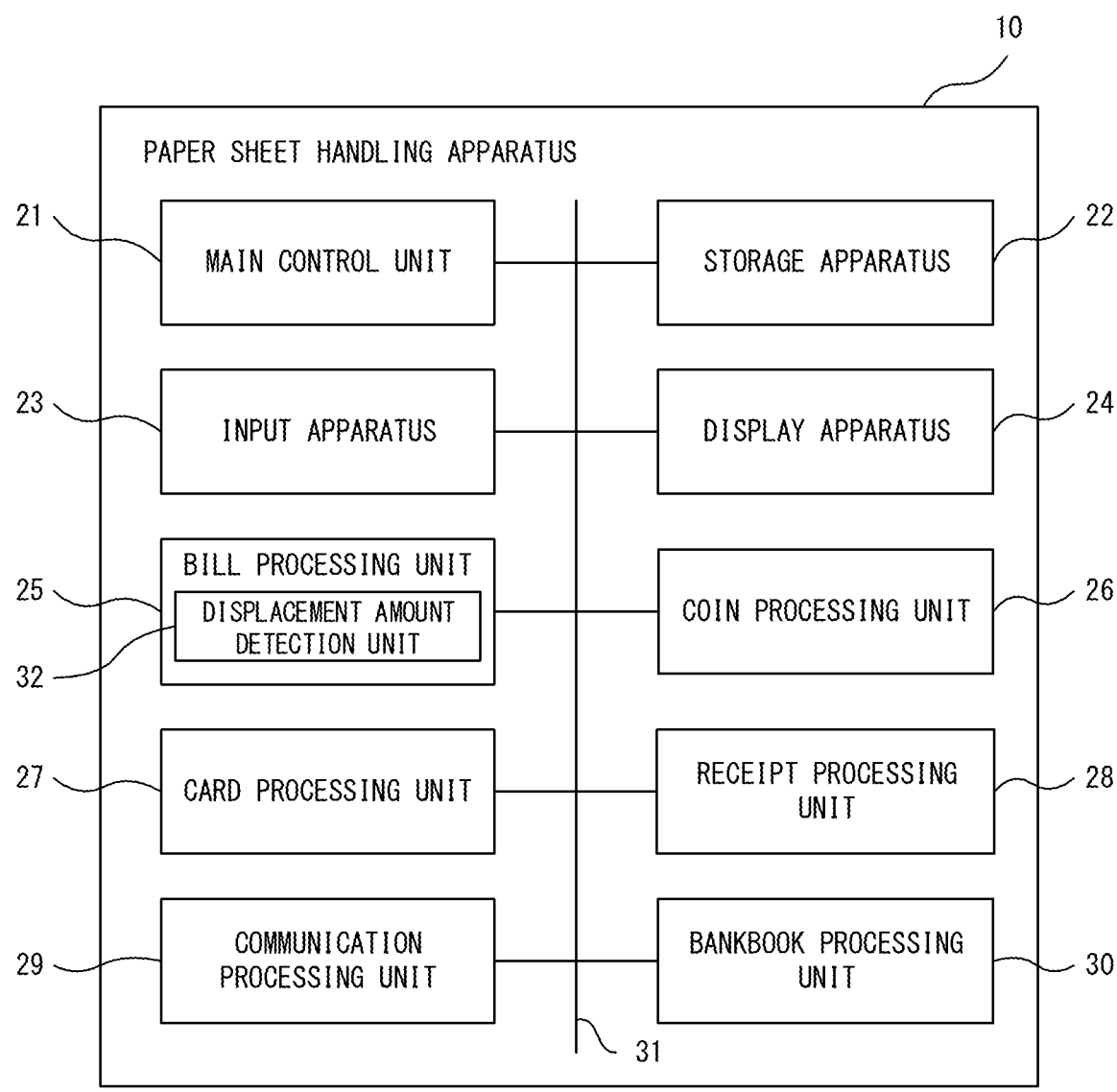
FIG. 2 exemplifies the hardware configuration of a paper sheet handling apparatus in accordance with an embodiment.

FIG. 2 exemplifies the hardware configuration of a paper sheet handling apparatus in accordance with an embodiment.

A paper sheet handling apparatus 10 exemplified in FIG. 2 includes a main control unit 21, a storage apparatus 22, an input apparatus 23, a display apparatus 24, a bill processing unit 25, a coin processing unit 26, a card processing unit 27, a receipt processing unit 28, a communication processing unit 29, and a bankbook processing unit 30, which are connected to each other by a bus 31.

The main control unit 21 includes a processor such as a central processing unit (CPU), and a random access memory (RAM). The processor controls the entirety of the operations of the paper sheet handling apparatus 10 by executing various programs, such as programs for an operating system (OS) and application programs. The RAM temporarily stores a portion of a program executed by the processor and is used as a working storage region for the processor. Alternatively, the main control unit 21 may be formed from, for example, a field programmable gate array (FPGA) and/or an application specific integrated circuit (ASIC). For example, the main control unit 21 may perform a bill determination process. The bill determination process is a process for determining which of one bill, a bill having tape applied thereto, two bills laid on top of one another (double-fed bills), or another bill is passing a predetermined position on a transporting path on which inserted bills are transported one by one as a general rule (transporting path in the bill processing unit 25).

The storage apparatus 22 stores, for example, various programs executed by the processor of the main control unit 21 and various data necessary for execution of the programs. The storage apparatus 22 includes a reference-displacement-amount storage region in which a reference displacement amount is stored, a bill-thickness storage region in which the thickness of one bill is stored, and a tape-thickness-threshold storage region in which a tape thickness threshold is stored. The reference displacement amount is also a displacement amount detected by a displacement amount detection unit 32 (described hereinafter) when it is determined according to the bill determination process performed by the main control unit 21 that one bill is passing a predetermined position on the transporting path. Initial values are stored in advance in the reference-displacement-amount storage region, the bill-thickness storage region, and the tape-thickness-threshold storage region. For example, the storage apparatus 22 may be a hard disk drive (HDD).

The input apparatus 23 and the display apparatus form the customer operation screen 11. The display apparatus 24 is, for example, a liquid crystal display (LCD). The input apparatus 23 is a touch panel disposed on the display apparatus 24. The input apparatus 23 detects an operation input to the input apparatus 23 and reports the detection result to the main control unit 21.

The bill processing unit 25 allows a bill to be inserted/ejected into/from the cash insertion-ejection unit 12. The bill processing unit 25 also counts the number of inserted bills, inspects the inserted bills, and counts the number of bills to be ejected. The bill processing unit 25 includes the displacement amount detection unit 32, which is intended to detect a displacement amount used by the main control unit 21 in the bill determination process. Details of the displacement amount detection unit 32 are described hereinafter using FIGS. 3, 4A, 4B, and 4C.

The coin processing unit 26 allows a coin to be inserted/ejected into/from the cash insertion-ejection unit 12. The coin processing unit 26 also counts the number of inserted coins, inspects the inserted coins, and counts the number of coins to be ejected.

The card processing unit 27 allows a card to be inserted/ejected into/from the card acceptance port 14. The card processing unit 27 reads/writes information (data) from/to a magnetic stripe on an inserted card or an integrated circuit (IC) chip therein.

The receipt processing unit 28 issues a receipt on which transaction details are printed, and ejects the same through the receipt issuance port 15.

The communication processing unit 29 is connected to a network (not illustrated) and communicates with, for example, a host computer (not illustrated) over the network.

The bankbook processing unit 30 allows a bankbook to be inserted/ejected into/from the bankbook acceptance unit 13. The bankbook processing unit 30 reads information (data) recorded on a magnetic stripe on an inserted bankbook and updates the bankbook.

Figure 3:
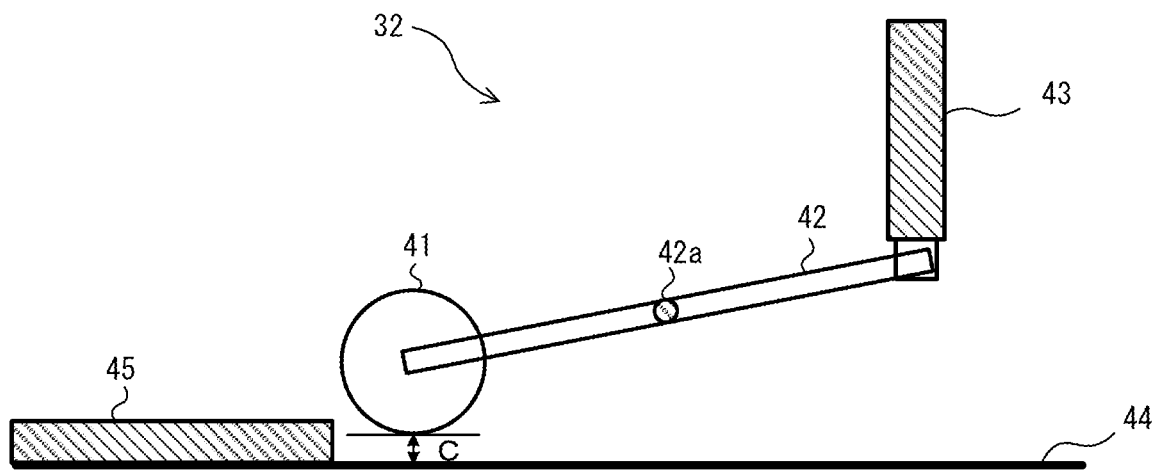
FIG. 3 schematically exemplifies the configuration of a displacement amount detection unit.

FIG. 3 schematically exemplifies the configuration of a displacement amount detection unit.

A displacement amount detection unit 32 exemplified in FIG. 3 includes a pressing roller 41, a displacement conveyance lever 42, and a displacement amount detection sensor 43.

The pressing roller 41 is intended to, for example, press a bill 45 against a transporting face 44 of a transporting path on which bills 45 are transported one by one as a general rule so that the inserted bills can be inspected. The initial position of the pressing roller 41 is distant from the transporting face 44 by a prescribed distance (C). The prescribed distance (C) is less than the thickness of one bill. The prescribed distance (C) is provided between the transporting face 44 and the pressing roller 41 in order to prevent a jam from occurring when a bill 45 passes between the transporting face 44 and the pressing roller 41. Note that, in FIG. 3, the transporting direction of a bill 45 is a rightward direction (the same is true for FIGS. 4A, 4B, and 4C).

The displacement conveyance lever 42 conveys, to the displacement amount detection sensor 43 with a shaft 42a as a fulcrum, a displacement of the pressing roller 41 from the initial position, wherein the pressing roller 41 is displaced according to the thickness of a bill 45 passing between the transporting face 44 and the pressing roller 41. The transporting face 44 is not displaced.

The displacement amount detection sensor 43 detects, from the displacement of the pressing roller 41 conveyed from the displacement conveyance lever 42, the amount of displacement of the pressing roller 41 from the initial position in a direction perpendicular to the transporting face 44.

Figure 4A:
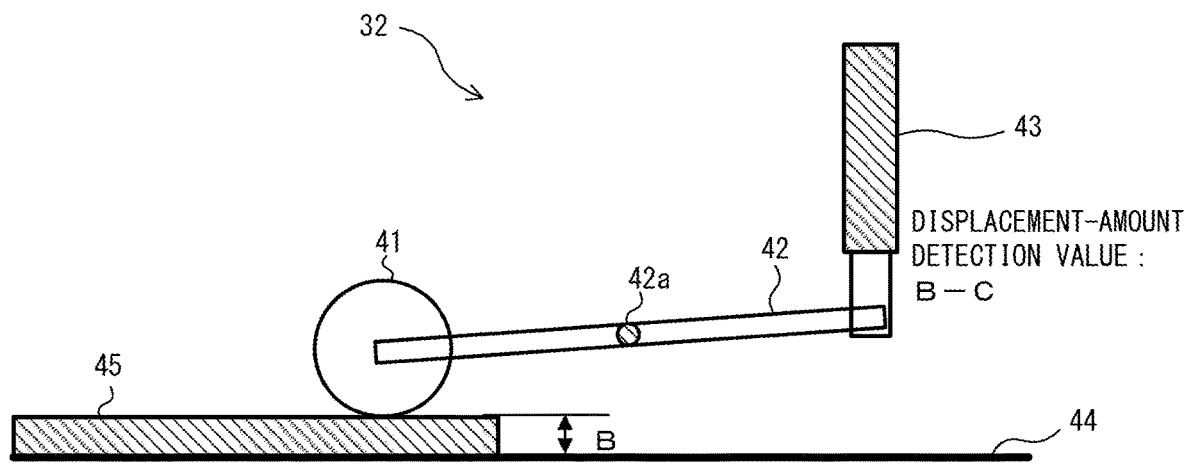
FIG. 4A schematically exemplifies an operation performed when one bill passes between a transporting face and a pressing roller.
Figure 4B:
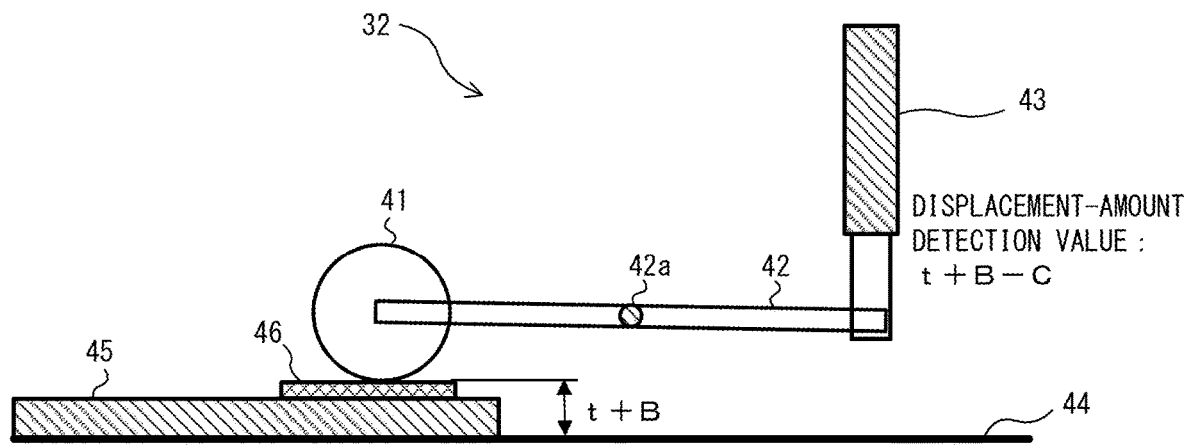
FIG. 4B schematically exemplifies an operation performed when a bill having tape applied thereto passes between a transporting face and a pressing roller.
Figure 4C:
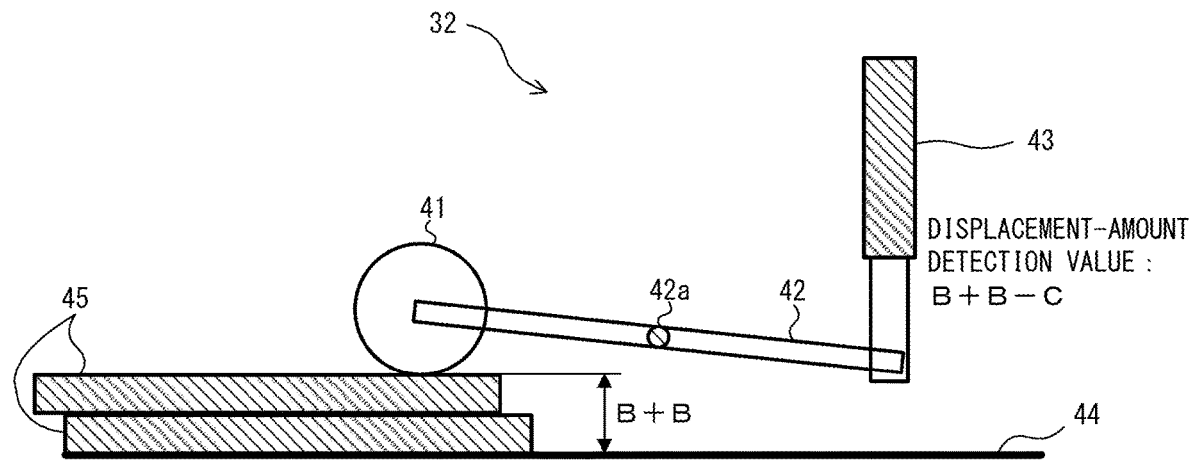
FIG. 4C schematically exemplifies an operation performed when two bills laid on top of one another pass between a transporting face and a pressing roller.

FIGS. 4A, 4B, and 4C schematically exemplify operations of the displacement amount detection unit. Specifically, FIG. 4A schematically exemplifies an operation performed when one bill passes between the transporting face and the pressing roller. FIG. 4B schematically exemplifies an operation performed when a bill having tape applied thereto passes between the transporting face and the pressing roller. FIG. 4C schematically exemplifies an operation performed when two bills laid on top of one another pass between the transporting face and the pressing roller.

In the operation exemplified in FIG. 4A, the pressing roller 41 is displaced according to a thickness (B) of one bill 45 passing between the transporting face 44 and the pressing roller 41, and the displacement amount detection sensor 43 detects a displacement amount (B−C) provided in this situation, i.e., the amount of displacement of the pressing roller 41 from the initial position in a direction perpendicular to the transporting face 44.

In the operation exemplified in FIG. 4B, the pressing roller 41 is displaced according to a thickness (t+B (t is the thickness of tape 46)) of a bill 45 having tape 46 applied thereto passing between the transporting face 44 and the pressing roller 41, and the displacement amount detection sensor 43 detects a displacement amount (t+B−C) provided in this situation, i.e., the amount of displacement of the pressing roller 41 from the initial position in a direction perpendicular to the transporting face 44.

In the operation exemplified in FIG. 4C, the pressing roller 41 is displaced according to a thickness (B+B) of two bills 45 laid on top of one another passing between the transporting face 44 and the pressing roller 41, and the displacement amount detection sensor 43 detects a detection amount (B+B−C) provided in this situation, i.e., the amount of displacement of the pressing roller 41 from the initial position in a direction perpendicular to the transporting face 44.

As indicated above, the displacement amount detection unit 32 cannot detect the absolute amount of the thickness of one bill, because the initial position of the pressing roller 41 is, as exemplified in FIG. 3, distant from the transporting face 44 by the prescribed distance (C). However, the thickness of one bill can be determined by calculation using displacement-amount detection values obtained in the operations exemplified in FIGS. 4A and 4C. Specifically, the thickness (B) of one bill can be calculated by subtracting the displacement-amount detection value (B−C) obtained in the operation exemplified in FIG. 4A (the operation performed when one bill 45 passes between the transporting face 44 and the pressing roller 41) from the displacement-amount detection value (B+B−C) obtained in the operation exemplified in FIG. 4C (the operation performed when two bills 45 laid on top of one another pass between the transporting face 44 and the pressing roller 41).

Figure 5:
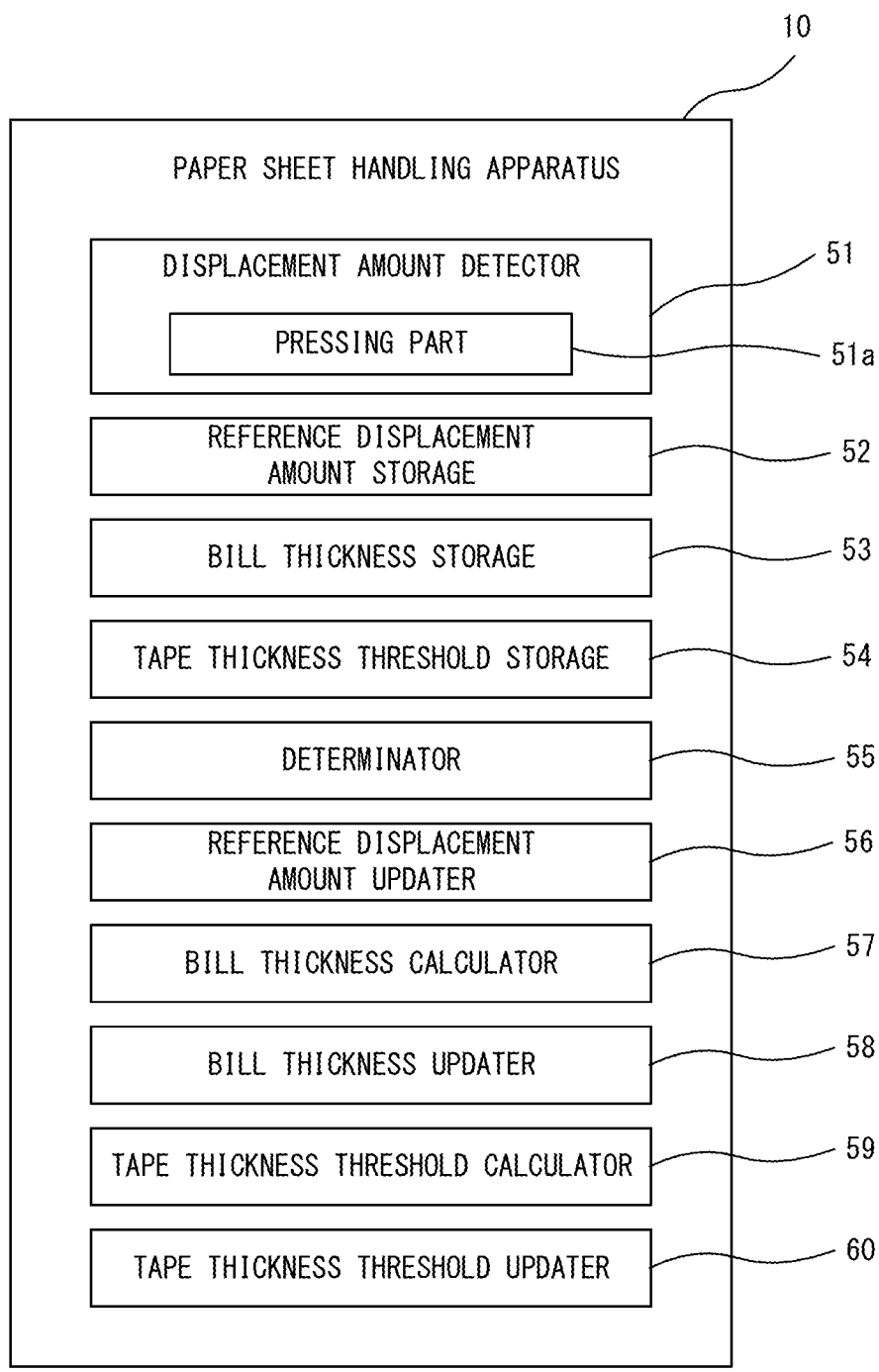
FIG. 5 exemplifies functional configurations pertaining to a bill determination process performed by a paper sheet handling apparatus in accordance with an embodiment.

FIG. 5 exemplifies functional configurations pertaining to a bill determination process performed by a paper sheet handling apparatus in accordance with an embodiment.

A paper sheet handling apparatus 10 exemplified in FIG. 5 includes a displacement amount detector 51, a reference displacement amount storage 52, a bill thickness storage 53, a tape thickness threshold storage 54, a determinator 55, a reference displacement amount updater 56, a bill thickness calculator 57, a bill thickness updater 58, a tape thickness threshold calculator 59, and a tape thickness threshold updater 60.

The displacement amount detector 51 includes a pressing part 51a that is intended to press a bill against the transporting face of a bill transporting path and has an initial position at which the pressing part 51a is not in contact with the transporting face of the bill transporting path. The displacement amount detector 51 detects the amount of displacement of the pressing part 51a, which is displaced according to the thickness of a bill passing between the transporting face and the pressing part 51a, from the initial position in a direction perpendicular to the transporting face. For example, the displacement amount detector 51 and the pressing part 51a may correspond to the displacement amount detection unit 32 and the pressing roller 41.

The reference displacement amount storage 52 stores a reference displacement amount. The reference displacement amount storage 52 stores a reference displacement amount in advance as an initial value. For example, the reference displacement amount storage 52 may correspond to the reference-displacement-amount storage region of the storage apparatus 22.

The bill thickness storage 53 stores the thickness of one bill. The bill thickness storage 53 stores the thickness of one bill in advance as an initial value. For example, the bill thickness storage 53 may correspond to the bill-thickness storage region of the storage apparatus 22.

The tape thickness threshold storage 54 stores a tape thickness threshold. The tape thickness threshold storage 54 stores a tape thickness threshold in advance as an initial value. For example, the tape thickness threshold storage 54 may correspond to the tape-thickness-threshold storage region of the storage apparatus 22.

On the basis of a displacement amount detected by the displacement amount detector 51, the reference displacement amount stored by the reference displacement amount storage 52, the thickness of one bill stored by the bill thickness storage 53, and the tape thickness threshold stored by the tape thickness threshold storage 54, the determinator 55 determines which of one bill, a bill having tape applied thereto, two bills laid on top of one another, or another bill is passing between the transporting face and the pressing part 51a. For example, the determinator 55 may correspond to the function of a portion of the main control unit 21.

For example, the determinator 55 may determine that one bill is passing between the transporting face and the pressing part 51a when a displacement amount detected by the displacement amount detector 51 is less than a first threshold based on the reference displacement amount stored by the reference displacement amount storage 52 and the tape thickness threshold stored by the tape thickness threshold storage 54. For example, the determinator 55 may determine that a bill having tape applied thereto is passing between the transporting face and the pressing part 51a when a displacement amount detected by the displacement amount detector 51 is equal to or greater than the first threshold and less than a second threshold based on the thickness of one bill stored by the bill thickness storage 53 and the reference displacement amount stored by the reference displacement amount storage 52. For example, the determinator 55 may determine that two bills laid on top of one another are passing between the transporting face and the pressing part 51a when a displacement amount detected by the displacement amount detector 51 is equal to or greater than the second threshold and less than a third threshold based on the thickness of one bill stored by the bill thickness storage 53 and the reference displacement amount stored by the reference displacement amount storage 52. The first threshold is, for example, the total of the tape thickness threshold stored by the tape thickness threshold storage 54 and the reference displacement amount stored by the reference displacement amount storage 52. The second threshold is, for example, the total of the thickness of one bill stored by the bill thickness storage 53 and the reference displacement amount stored by the reference displacement amount storage 52. The third threshold is, for example, the total of the reference displacement amount stored by the reference displacement amount storage 52 and twice the thickness of one bill stored by the bill thickness storage 53.

When the determinator 55 determines that one bill is passing between the transporting face and the pressing part 51a, the reference displacement amount updater 56 updates the value of the reference displacement amount stored by the reference displacement amount storage 52 to the displacement amount detected by the displacement amount detector 51 at the time of the determination. For example, the reference displacement amount updater 56 may correspond to the function of another portion of the main control unit 21.

When the determinator 55 determines that two bills laid on top of one another are passing between the transporting face and the pressing part 51a, the bill thickness calculator 57 calculates the thickness of one bill by subtracting the reference displacement amount stored by the reference displacement amount storage 52 from the displacement amount detected by the displacement amount detector 51 at the time of the determination. For example, the bill thickness calculator 57 may correspond to the function of another portion of the main control unit 21.

The bill thickness updater 58 updates the thickness of one bill stored by the bill thickness storage 53 to the thickness of one bill calculated by the bill thickness calculator 57. For example, the bill thickness updater 58 may correspond to the function of another portion of the main control unit 21.

The tape thickness threshold calculator 59 calculates a tape thickness threshold on the basis of the thickness of one bill calculated by the bill thickness calculator 57. For example, the tape thickness threshold calculator 59 may calculate a tape thickness threshold by multiplying the thickness of one bill calculated by the bill thickness calculator 57 by a prescribed factor. In this example, the prescribed factor corresponds to the proportion of the thickness of tape to the thickness of one bill. For example, the tape thickness threshold calculator 59 may correspond to the function of another portion of the main control unit 21.

The tape thickness threshold updater 60 updates the tape thickness threshold stored by the tape thickness threshold storage 54 to the tape thickness threshold calculated by the tape thickness threshold calculator 59. For example, the tape thickness threshold updater 60 may correspond to the function of another portion of the main control unit 21.

The following describes a bill determination process performed by the paper sheet handling apparatus 10.

Figure 6:
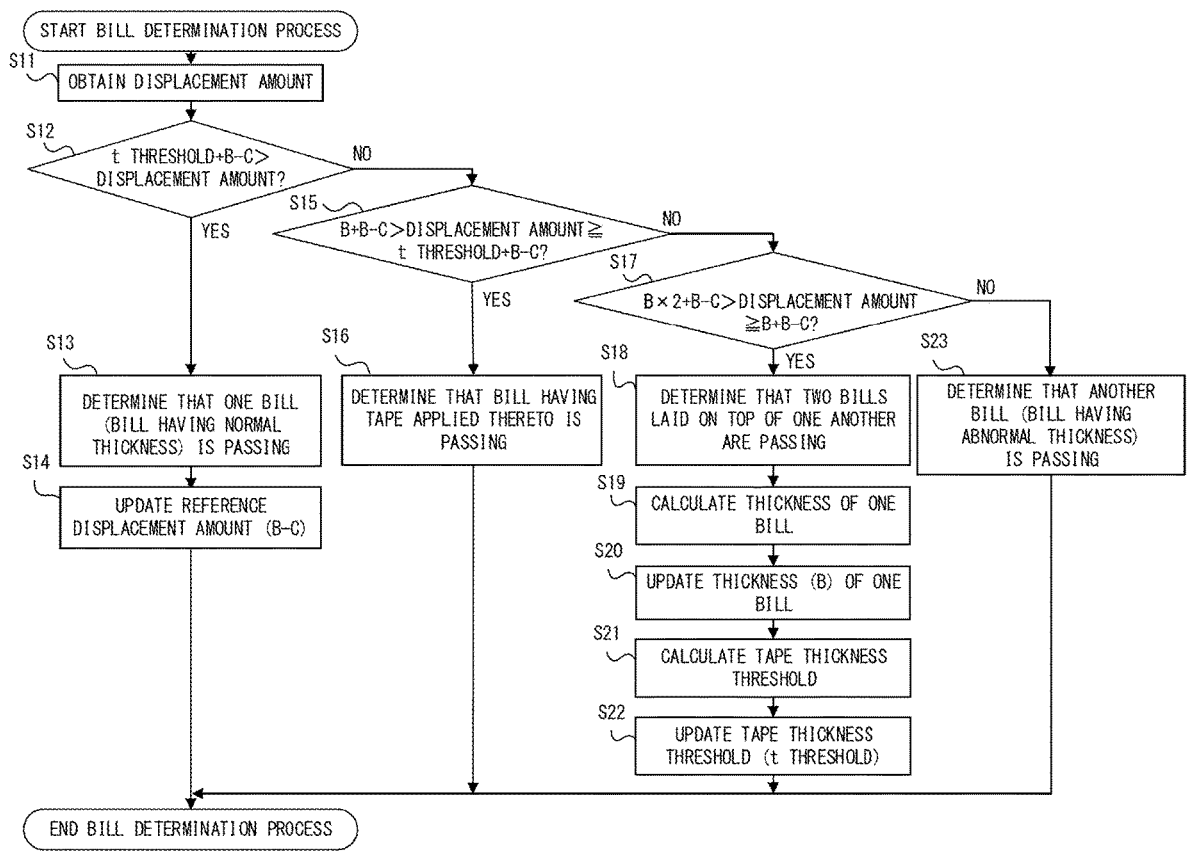
FIG. 6 is a flowchart exemplifying the flow of a bill determination process performed by a paper sheet handling apparatus in accordance with an embodiment.

FIG. 6 is a flowchart exemplifying the flow of a bill determination process performed by a paper sheet handling apparatus in accordance with an embodiment.

The bill determination process exemplified in FIG. is performed every time a bill passes between the transporting face 44 and the pressing roller 41.

Upon the bill determination process exemplified in FIG. 6 being started, the main control unit 21 first obtains a displacement amount detected by the displacement amount detection unit 32 (S11).

Next, the main control unit 21 determines whether the displacement amount obtained in S11 is less than the total (t threshold+B−C) of a tape thickness threshold (t threshold) stored in the tape-thickness-threshold storage region of the storage apparatus 22 and a reference displacement amount (B−C) stored in the reference-displacement-amount storage region of the storage apparatus (S12). Note that the expression "t threshold+B−C" is an example of the first threshold.

When the result of the determination in S12 is YES, the main control unit 21 determines that one bill (a bill having a normal thickness) is passing between the transporting face 44 and the pressing roller 41 (S13), and updates the reference displacement amount (B−C) stored in the reference-displacement-amount storage region of the storage apparatus 22 to the displacement amount obtained in S11 (S14), and the bill determination process exemplified in FIG. 6 ends.

Meanwhile, when the result of the determination in S12 is NO, the main control unit 21 determines whether the displacement amount obtained in S11 is equal to or greater than the total (t threshold+B−C) of the tape thickness threshold (t threshold) stored in the tape-thickness-threshold storage region of the storage apparatus 22 and the reference displacement amount (B−C) stored in the reference-displacement-amount storage region of the storage apparatus 22 and is less than the total (B+B−C) of the thickness (B) of one bill stored in the bill-thickness storage region of the storage apparatus 22 and the reference displacement amount (B−C) stored in the reference-displacement-amount storage region of the storage apparatus 22 (S15). Note that the expression "B+B−C" is an example of the second threshold.

When the result of the determination in S15 is YES, the main control unit 21 determines that a bill having tape applied thereto is passing between the transporting face 44 and the pressing roller 41 (S16), and the bill determination process exemplified in FIG. 6 ends.

Meanwhile, when the result of the determination in S15 is NO, the main control unit 21 determines whether the displacement amount obtained in S11 is equal to or greater than the total (B+B−C) of the thickness (B) of one bill stored in the bill-thickness storage region of the storage apparatus 22 and the reference displacement amount (B−C) stored in the reference-displacement-amount storage region of the storage apparatus 22 and is less than the total (B×2+B−C) of twice (B×2) the thickness (B) of one bill stored in the bill-thickness storage region of the storage apparatus 22 and the reference displacement amount (B−C) stored in the reference-displacement-amount storage region of the storage apparatus 22 (S17). Note that the expression "B×2+B−C" is an example of the third threshold.

When the result of the determination in S17 is YES, the main control unit 21 determines that two bills laid on top of one another are passing between the transporting face 44 and the pressing roller 41 (S18). Then, the thickness of one bill is calculated by subtracting the reference displacement amount (B−C) stored in the reference-displacement-amount storage region of the storage apparatus 22 from the displacement amount obtained in S11 (S19), and the thickness (B) of one bill stored in the bill-thickness storage region of the storage apparatus 22 is updated to the thickness calculated in S19 (S20). A tape thickness threshold is calculated by multiplying the thickness of one bill calculated in S19 by the prescribed factor (the factor corresponding to the proportion of the thickness of tape to the thickness of one bill) (S21), and the tape thickness threshold (t threshold) stored in the tape-thickness-threshold storage region of the storage apparatus 22 is updated to the tape thickness threshold calculated in S21 (S22). After S22, the bill determination process exemplified in FIG. 6 ends.

Meanwhile, when the result of the determination in S17 is NO, the main control unit 21 determines that another bill (a bill having an abnormal thickness) is passing between the transporting face 44 and the pressing roller 41 (S23), and the bill determination process exemplified in FIG. 6 ends.

A bill determined as one bill (a bill having a normal thickness) in the bill determination process exemplified in FIG. 6 is then stored in a bill cassette in which bills that can be used as bills to be ejected are stored. By contrast, a bill determined as a bill having tape applied thereto is then stored in a prescribed collection bill cassette so as not to be used as a bill to be ejected, and will be taken out by a store staff member such as a clerk at a later date. Bills determined as two bills laid on top of one another or another bill determined as a bill having an abnormal thickness is returned to a customer through the cash insertion-ejection unit 12.

As described above, every time one bill passes between the transporting face 44 and the pressing roller 41, the paper sheet handling apparatus 10 updates the reference displacement amount (B−C) stored in the reference-displacement-amount storage region of the storage apparatus to a value corresponding to the state of a temporal variation in the displacement amount detection unit 32 at that time. Every time two bills laid on top of one another pass between the transporting face 44 and the pressing roller 41, the thickness (B) of one bill stored in the bill-thickness storage region of the storage apparatus 22 and the tape thickness threshold (t threshold) stored in the tape-thickness-threshold storage region of the storage apparatus 22 are updated to values corresponding to the state of a temporal variation in the displacement amount detection unit at that time. Accordingly, even if the displacement amount detection unit 32 exhibits a temporal variation (e.g., even if the initial position of the pressing roller 41, the output value of the displacement amount detection sensor 43, or the like exhibits a temporal variation), it can be accurately determined which of one bill, a bill having tape applied thereto, two bills laid on top of one another, or another bill is passing between the transporting face 44 and the pressing roller 41.

The paper sheet handling apparatus 10 can be updated not only by bills inserted by customers. A store staff member may periodically insert one bill and two bills laid on top of one another into the paper sheet handling apparatus 10 so as to periodically update the reference displacement amount (B−C) stored in the reference-displacement-amount storage region of the storage apparatus 22, the thickness (B) of one bill stored in the bill-thickness storage region of the storage apparatus 22, and the tape thickness threshold (t threshold) stored in the tape-thickness-threshold storage region of the storage apparatus 22.

The paper sheet handling apparatus 10 performs the above-described bill determination process without distinguishing between denominations. The reason for this is that, as a general rule, bills issued by the same source (issued in the country) have substantially the same thickness, irrespective of denomination. However, after denominations are distinguished from each other, the above-described bill determination process may be performed for each denomination. In this case, for example, the storage apparatus 22 may include, for each denomination, a reference-displacement-amount storage region, a bill-thickness storage region, and a tape-thickness-threshold storage region, and the above-described bill determination process may be performed for each distinguished denomination.

Embodiments of the present invention have been described, but the invention is not limited to the embodiments described above and can have various improvements or changes made therefor without departing from the gist of the invention.

The invention claimed is:

1. A non-transitory recording medium having a paper sheet handling program recorded thereon, the paper sheet handling program causing a processor for a paper sheet handling apparatus to perform a process, the paper sheet handling apparatus including
a displacement amount detector that includes a pressing part intended to press a paper sheet against a transporting face of a paper sheet transporting path and having an initial position at which the pressing part is not in contact with the transporting face of the paper sheet transporting path, the displacement amount detector detecting a displacement amount of displacement of the pressing part from the initial position in a direction perpendicular to the transporting face, the pressing part being displaced according to a thickness of a paper sheet passing between the transporting face and the pressing part,
a reference displacement amount storage that stores a reference displacement amount,
a paper sheet thickness storage that stores a thickness of one paper sheet, and
a tape thickness threshold storage that stores a tape thickness threshold, the process comprising:
on the basis of the displacement amount detected by the displacement amount detector, the reference displacement amount stored by the reference displacement amount storage, the thickness of one paper sheet stored by the paper sheet thickness storage, and the tape thickness threshold stored by the tape thickness threshold storage, determining which of one paper sheet, a paper sheet having tape applied thereto, two paper sheets laid on top of one another, or another paper sheet is passing between the transporting face and the pressing part;
when a determination that one paper sheet is passing between the transporting face and the pressing part is made, updating a value of the reference displacement amount stored by the reference displacement amount storage to a displacement amount detected by the displacement amount detector at a time of the determination; and
when a determination that two paper sheets laid on top of one another are passing between the transporting face and the pressing part is made, calculating a thickness of one paper sheet by subtracting the reference displacement amount stored by the reference displacement amount storage from a displacement amount detected by the displacement amount detector at a time of the determination, updating the thickness of one paper sheet stored by the paper sheet thickness storage to the calculated thickness of one paper sheet, calculating a tape thickness threshold on the basis of the calculated thickness of one paper sheet, and updating the tape thickness threshold stored by the tape thickness threshold storage to the calculated tape thickness threshold.

2. The non-transitory recording medium of claim 1, wherein the process further comprises calculating the tape thickness threshold by multiplying the calculated thickness of one paper sheet by a prescribed factor.

3. The non-transitory recording medium of claim 1, wherein the process further comprises determining that one paper sheet is passing between the transporting face and the pressing part when the displacement amount detected by the displacement amount detector is less than a first threshold based on the reference displacement amount stored by the reference displacement amount storage and the tape thickness threshold stored by the tape thickness threshold storage.

4. The non-transitory recording medium of claim 3, wherein the process further comprises determining that a paper sheet having tape applied thereto is passing between the transporting face and the pressing part when the displacement amount detected by the displacement amount detector is equal to or greater than the first threshold and less than a second threshold based on the thickness of one paper sheet stored by the paper sheet thickness storage and the reference displacement amount stored by the reference displacement amount storage.

5. The non-transitory recording medium of claim 4, wherein the process further comprises determining that two paper sheets laid on top of one another are passing between the transporting face and the pressing part when the displacement amount detected by the displacement amount detector is equal to or greater than the second threshold and less than a third threshold based on the thickness of one paper sheet stored by the paper sheet thickness storage and the reference displacement amount stored by the reference displacement amount storage.

6. The non-transitory recording medium of claim 3, wherein the first threshold is a total of the tape thickness threshold stored by the tape thickness threshold storage and the reference displacement amount stored by the reference displacement amount storage.

7. The non-transitory recording medium of claim 4, wherein the second threshold is a total of the thickness of one paper sheet stored by the paper sheet thickness storage and the reference displacement amount stored by the reference displacement amount storage.

8. The non-transitory recording medium of claim 5, wherein the third threshold is a total of the reference displacement amount stored by the reference displacement amount storage and twice the thickness of one paper sheet stored by the paper sheet thickness storage.

9. A paper sheet handling apparatus comprising:
a displacement amount detector that includes a pressing part intended to press a paper sheet against a transporting face of a paper sheet transporting path and having an initial position at which the pressing part is not in contact with the transporting face of the paper sheet transporting path, the displacement amount detector detecting a displacement amount of displacement of the pressing part from the initial position in a direction perpendicular to the transporting face, the pressing part being displaced according to a thickness of a paper sheet passing between the transporting face and the pressing part;
a reference displacement amount storage that stores a reference displacement amount;
a paper sheet thickness storage that stores a thickness of one paper sheet;
a tape thickness threshold storage that stores a tape thickness threshold;

a determinator that, on the basis of the displacement amount detected by the displacement amount detector, the reference displacement amount stored by the reference displacement amount storage, the thickness of one paper sheet stored by the paper sheet thickness storage, and the tape thickness threshold stored by the tape thickness threshold storage, determines which of one paper sheet, a paper sheet having tape applied thereto, two paper sheets laid on top of one another, or another paper sheet is passing between the transporting face and the pressing part;

a reference displacement amount updater that, when the determinator makes a determination that one paper sheet is passing between the transporting face and the pressing part, updates a value of the reference displacement amount stored by the reference displacement amount storage to a displacement amount detected by the displacement amount detector at a time of the determination;

a paper sheet thickness calculator that, when the determinator makes a determination that two paper sheets laid on top of one another are passing between the transporting face and the pressing part, calculates a thickness of one paper sheet by subtracting the reference displacement amount stored by the reference displacement amount storage from a displacement amount detected by the displacement amount detector at a time of the determination;

a paper sheet thickness updater that updates the thickness of one paper sheet stored by the paper sheet thickness storage to the thickness of one paper sheet calculated by the paper sheet thickness calculator;

a tape thickness threshold calculator that calculates a tape thickness threshold on the basis of the thickness of one paper sheet calculated by the paper sheet thickness calculator; and a tape thickness threshold updater that updates the tape thickness threshold stored by the tape thickness threshold storage to the tape thickness threshold calculated by the tape thickness threshold calculator.

10. The paper sheet handling apparatus of claim 9, wherein the tape thickness threshold calculator calculates the tape thickness threshold by multiplying the thickness of one paper sheet calculated by the paper sheet thickness calculator by a prescribed factor.

* * * * *